Dec. 12, 1967 B. NITSCHKE ET AL 3,357,534

KEYBOARD CAPABLE OF PRODUCING EITHER OF TWO DIFFERENT CODES

Filed Oct. 23, 1965 2 Sheets-Sheet 1

INVENTORS
BRUNO NITSCHKE
ALFRED RÜCKERL
BY [signature] ATTORNEYS

Dec. 12, 1967 B. NITSCHKE ET AL 3,357,534

KEYBOARD CAPABLE OF PRODUCING EITHER OF TWO DIFFERENT CODES

Filed Oct. 23, 1965 2 Sheets-Sheet 2

INVENTORS
BRUNO NITSCHKE
ALFRED RÜCKERL
BY Hill & Hill ATTORNEYS

United States Patent Office 3,357,534

Patented Dec. 12, 1967

3,357,534
KEYBOARD CAPABLE OF PRODUCING EITHER OF TWO DIFFERENT CODES

Bruno Nitschke and Alfred Rückerl, Munich, Germany, assignors to Siemens & Halske Aktiengesellschaft, Berlin and Munich, Germany, a corporation of Germany
Filed Oct. 23, 1965, Ser. No. 505,226
Claims priority, application Germany, Apr. 30, 1965, S 96,885
1 Claim. (Cl. 197—98)

Figure 1:
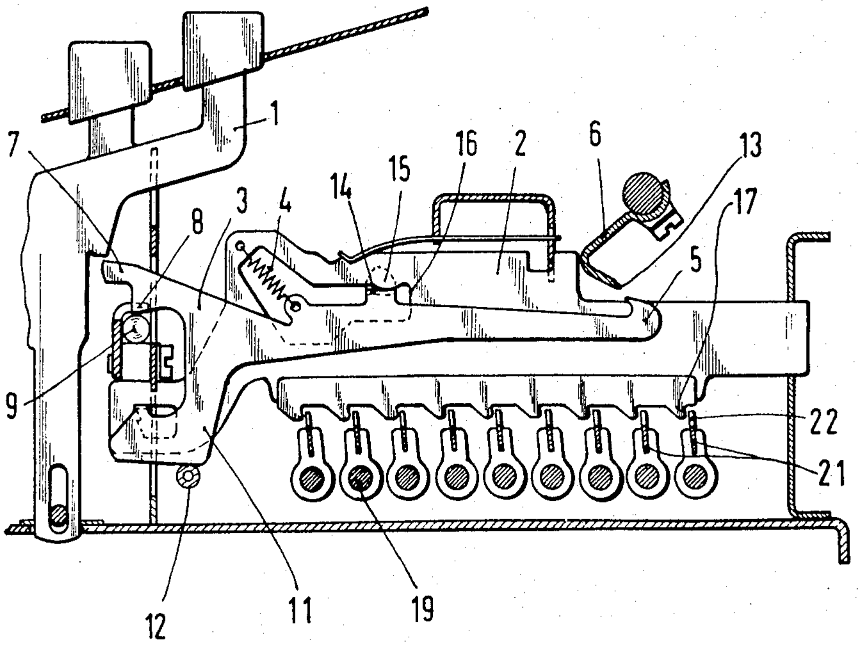

The invention relates to a keyboard for Teletype machines for the generation of signal steps by means of selector slides which are controllable by keys with double or multiple character occupation, and corresponding selector keys.

For a new eight-step code—at present several codes are concurrently in preparation for different purposes in telegraphy and data transmission—there is presented by reason of the large number of characters to be printed, the problem of using for the simplification of operation a double occupation of the sign keys. In such case an effort is made to have the keyboard arrangement correspond to that of the typewriter, and in particular, difficulties of readjustment should be avoided in the case of simultaneous use of both types of machines. Accordingly, as in typewriters, the majority of the keys must be doubly occupied. The shift to the character represented at the top portion of the key head takes place through operation of a shift key, as with the typewriter.

The difference in the character occupation of the keys of the typewriter keyboard, whose arrangement corresponds in each case to standard specifications, leads, in the case of use of an international telegraph alphabet, to the result that the code signs of two characters, allocated to a common key, differ from one another in arbitrary code steps. Further, the possibility exists, in the case of single occupation of the characters to allocate two different codes to the individual keys. On a full keyboard for a five element code, for example, with sixty-four singly occupied character keys there can be transmitted, on the one hand, telegraph alphabet No. 2 and, on the other hand, over internal connections the number-securing code.

An object of the present invention is that of developing a keyboard which, unlike the known keyboards, makes it possible, with use of a five to eight-step code to occupy the keys according to standard requirements in each case with two characters each of arbitrary allocation. In known keyboards it is merely possible to occupy a key with two characters whose code symbols differ from one another merely in one or two definite steps, since the known shifting possibilities do not permit a shift of arbitrary code steps or permit this only with a very great mechanical or electrical force. In one known keyboard, in which a shifting of all code steps is provided, it is possible to operate only with very high forces, at least with respect to the masses to be moved.

According to the invention the problem is solved by means of a keyboard for Teletype machines wherein there is arranged on each selector slide, a row of projections or lugs, one projection being provided thereon for each selector rocker member, and each selector rocker member is provided, in the range in which the same is displaceable singly or in common by one or more shift keys with a tooth or tooth gap disposed in the range of the projection allocated to such selector rocker member, the number of which corresponds to the number of steps to be selectively generated through such displacements thereof.

According to a preferred construction of the keyboard embodying the invention the teeth selectively disposed on the selector rocker members are, displaceable in axial direction of the selector rocker members into the engagement range of the allocated projections of the selector slides.

By utilization of a keyboard according to the invention it is possible to occupy keys each with two characters, whose code combinations do not stand in any relation whatsoever to one another. Where the code combinations allocated to a key differ in each case by two signs merely in certain steps, the keyboard is correspondingly simplified. Especially advantageous in the present keyboard system is the simple operation and the simple manufacture of the system.

Figure 2:
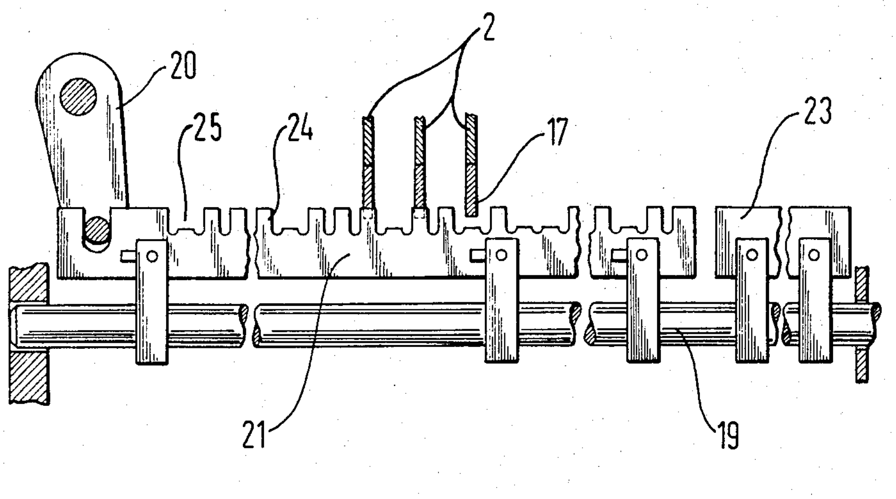

Details of the invention are described in the following with the aid of an example of construction which is illustrated in the drawing, in which:

FIG. 1 is a sectional view of the keyboard in the vicinity of a selector slide bar; and FIG. 2 is a front view of a selector in the range of selector slide bars.

For symbol selection through the stroke of a depressed key 1 of a Teletype machine, there is provided, in each instance, a follower pawl 3, arranged for pivotal and longitudinal movement about a rolling point 14–15, the pawl being swung, in opposition to the force of an oblique tension spring 4, to dispose a hook-shaped end 5 thereof into the path of motion of a rocker 6, actuated by auxiliary drive means. In this movement, to the simultaneous actuation of a second key, a blocking projection or cam 8, disposed under a coupling projection or cam 7 of the follower pawl 3, is moved into engagement with a ball lock 9. A pivoting of another follower pawl is thus impossible. Simultaneously there is actuated a release bar 12 engageable by the lower left guide 11 of the follower pawl 3, which bar in actuated position releases the drive means for effecting a back and forth movement of the drive rocker 6. After an initial movement of the rocker 6, its free edge 13 engages the follower hook 5 of the pawl 3. In the continuation of the stroke the follower pawl 3 is drawn to the right, as viewed in FIG. 1, against the longitudinal force component of the tension spring 4, until a central offset 14 on the carry-along point 15 of the follower pawl 3 bears on the right side of the bearing cut-out 16 of the selector slide 2. During the remainer of the stroke of the drive rocker 6, through the portion 16, follower pawl 3 moves the selector slide 2 therewith, the latter and the selector slide with the projections 17 thereon, is thereby being moved into actuating position.

On selector rocker members or shafts 19, each pivotal on their axis, there are arranged respective slides 21, slidable in the axial direction of the selector shafts and settable over a lever 20 in either of two end positions. By means of the displacing or shifting of the slide bars 21 with respect to the selector slides 2, a tooth 24 or a tooth gap 25 on each slide bar 21 may be selectively disposed in the range of the cooperable projection 17 of the corresponding selector slide. The selection of a tooth 24 or tooth gap 25 and alignment thereof in the path of the corresponding projection 17 corresponds to the two code steps which are to be transmitted by the particular projection 17 to the selector shaft 19 and thus determines which of the two characters occupying the allocated key 1 is to be transmitted. Consequently, it is possible by a simple axial displacement or shifting of the slide bar 21 on each of the selector shafts 19, by means of the corresponding levers 20, to effect a shift from any arbitrary code combination to any other arbitrary code combination.

The selector rocker members 23, cooperable with selector slide bars 2 which are allocated to singly occupied command keys, may be of known design and in such case a shifting mechanism on the selector shaft is unnecessary.

By the above a system is described which is adaptable to the particular requirements within the scope of the invention. If the code combinations of the characters arranged on a common key differ merely in certain code steps from one another, then it is only necessary to arrange, on the selector slides corresponding to such code combination steps, shiftable slide bars with correspondingly arranged tooth or tooth gaps.

Changes may be made within the scope and spirit of the appended claim which define what is believed to be new and desired to have protected by Letters Patent.

What is claimed is:

A keyboard for Teletype machines for the generation of character steps, comprising a plurality of selector slides each having a row of projections thereon and which are controllable by keys with multiple character occupation, a plurality of selector rocker members, mounted for pivotal movement, each slide having a projection for each selector rocker member, each selector member means interconnecting a respective key and a respective one of said selector slides for displacing said selector slides and said projections longitudinally through a predetermined range, each selector rocker member having at least two axial operative positions with respect to said selector slides, having a plurality of teeth separated by gaps, shift key means for axially shifting the selector rocker members thereby shifting a different tooth or gap into the range of a respective slide member projection allocated to such selector rocker member, whereby a corresponding projection engages one of said teeth for pivoting the respective selector rocker member or passes through one of the gaps without pivoting the respective selector rocker member, the number of said teeth corresponding to the number of steps to be selectively generated through such displacements thereof.

References Cited

UNITED STATES PATENTS

| | | | |
|---|---|---|---|
| 1,974,307 | 9/1934 | Griffith | 178—17 |
| 1,988,943 | 1/1935 | Griffith | 178—17 |
| 2,275,615 | 3/1942 | Doty | 197—17 XR |
| 2,559,637 | 7/1951 | Kirchel | 178—17 |
| 2,879,876 | 3/1959 | Palmer et al. | 197—16 |
| 2,938,952 | 5/1960 | Roggenstein | 178—17 |
| 3,152,759 | 10/1964 | May | 235—145 |
| 3,187,153 | 6/1965 | Barnard et al. | 197—98 |

ROBERT E. PULFREY, *Primary Examiner.*

E. S. BURR, *Assistant Examiner.*